April 9, 1963 R. K. LEONARD ET AL 3,084,496
MACHINE AND METHOD FOR HARVESTING CUCUMBERS
Filed Jan. 11, 1960 3 Sheets-Sheet 1
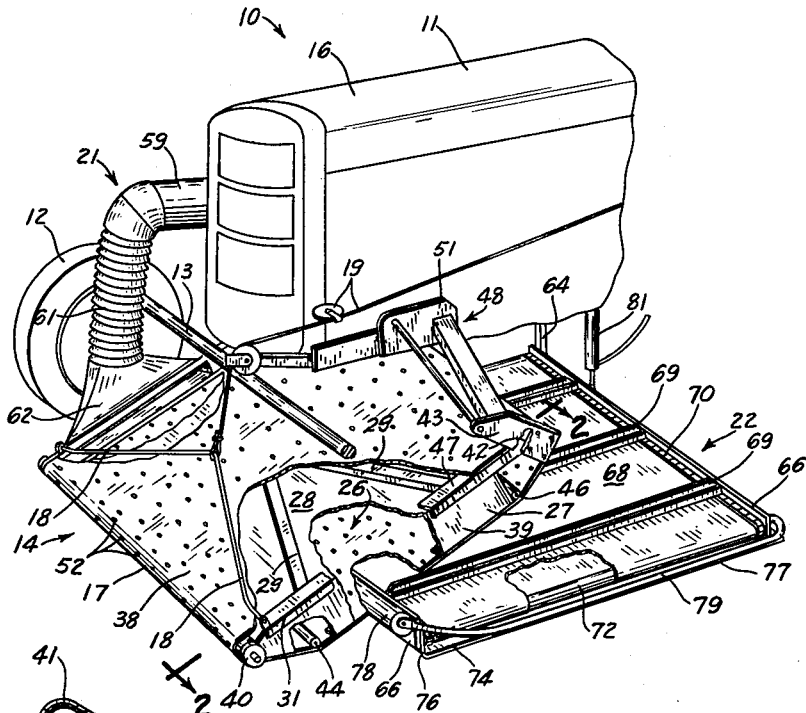
Fig. 1
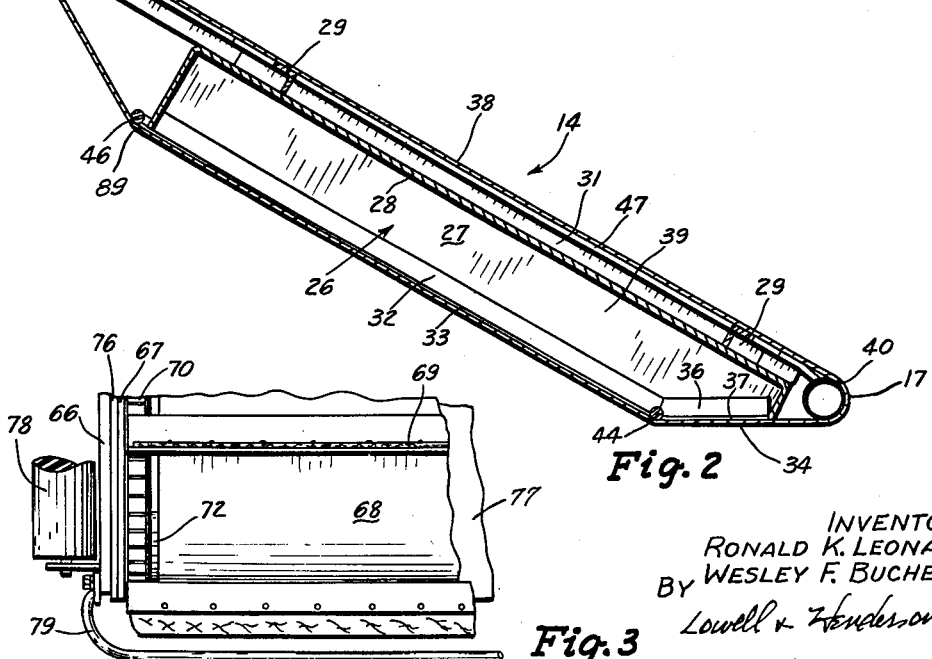
Fig. 2
Fig. 3
INVENTOR
RONALD K. LEONARD
WESLEY F. BUCHELE
BY
Lowell & Henderson
ATTORNEYS April 9, 1963  R. K. LEONARD ET AL  3,084,496
MACHINE AND METHOD FOR HARVESTING CUCUMBERS
Filed Jan. 11, 1960  3 Sheets-Sheet 3

INVENTOR
RONALD K. LEONARD
BY WESLEY F. BUCHELE

Lowell & Henderson
ATTORNEY'S

United States Patent Office 3,084,496
Patented Apr. 9, 1963

3,084,496
MACHINE AND METHOD FOR HARVESTING CUCUMBERS
Ronald K. Leonard, 602 E. 2nd, Madrid, Iowa, and Wesley F. Buchele, Michigan State University, East Lansing, Mich.
Filed Jan. 11, 1960, Ser. No. 1,824
6 Claims. (Cl. 56—327)

This invention relates to mechanical harvesting machines and particularly to a machine and a method for harvesting cucumbers.

Research on contemporary mechanical cucumber harvesters discloses that the over-all picking efficiency of these machines left considerable room for improvement, and that the harvesters varied in their ability to pick up the cucumber vines, in the amount of damage to the vines, fruit and leaves, and in their ability to separate the cucumber fruit from the vines.

The preferred form of this invention comprises an apparatus adapted to be attached to a self propelled portable frame or machine capable of being guided through a field of cucumber vines, the root ends of which have been trained to lie in a direction substantially normal to and transversely of the path of forward movement of the machine. The apparatus includes components arranged to elevate the vine portion of the cucumber plant by applying pneumatic suction to the leaves, to contact and disengage the cucumber fruit suspended from the vines while maintaining the latter elevated, to collect the fruit, and to release the vines for return to their original ground supported position so as not to disturb their trained position.

It was ascertained that cucumber leaves, typified by the Wisconsin SMR-12 variety, when acting as a diaphragm over a three-fourths inch diameter orifice would support at least an 80-inch column of water. As this strength was far in excess of the practical limit of pressures developed by mechanical fans, it was determined that the use of a vacuum pickup device would not be limited by the strength of the typical leaves. Study further indicated that the vines start to topple over and grow along the ground when approximately eight to ten inches high, that in the first one-half of the vine, including laterals, the average height of the leaves above the main stem was seven inches, that the stem of the leaves grows nearly perpendicular to the ground and to the main stem of the vine, and that the leaf in turn grows perpendicular to the leaf stem and is, therefore, substantially parallel with the ground.

Prior to harvesting, the vines are trained to grow to one side of the row in a direction substantially perpendicular to the center line of the row by a pneumatic vine training device which moves the vines by air action alone. The use of this device did not damage the vines and could be used as often as necessary during the growing season.

With these findings and observations in mind, it is an object of this invention to provide an improved mechanical cucumber harvester.

Another object of this invention is to provide an improved method of harvesting cucumbers.

It is another object of this invention to provide an apparatus for elevating the vine portion from the ground by acting upon the leaves thereof, for removing the cucumbers from the vine portion while maintaining it elevated, for collecting the separated cucumbers, and for permitting the vine portion to return to the ground in its initial position for subsequent mechanical harvesting.

A further object of this invention is the provision of a mechanical cucumber harvester utilizing a device for picking up cucumber vines by engaging the leaves thereof only, whereby to maintain vine damage at a minimum, the pickup device also being capable of placing the vines on another device for separating the cucumbers from the vine.

Another object of this invention is the provision of a mechanical cucumber harvester which is of a simple, economical construction, and efficient in operation.

These objects and other features and advantages will become apparent by reference to the following description and the accompanying drawings, wherein:

FIG. 1 is a fragmentary perspective view of a conventional farm tractor to which the cucumber harvester of this invention is assembled, with some parts removed and others cut away for the purpose of clarity;

FIG. 2 is an enlarged detail sectional view of a pickup unit taken along the line 2—2 in FIG. 1;

FIG. 3 is an enlarged fragmentary plan view of one corner of a picking unit;

Figure 4:
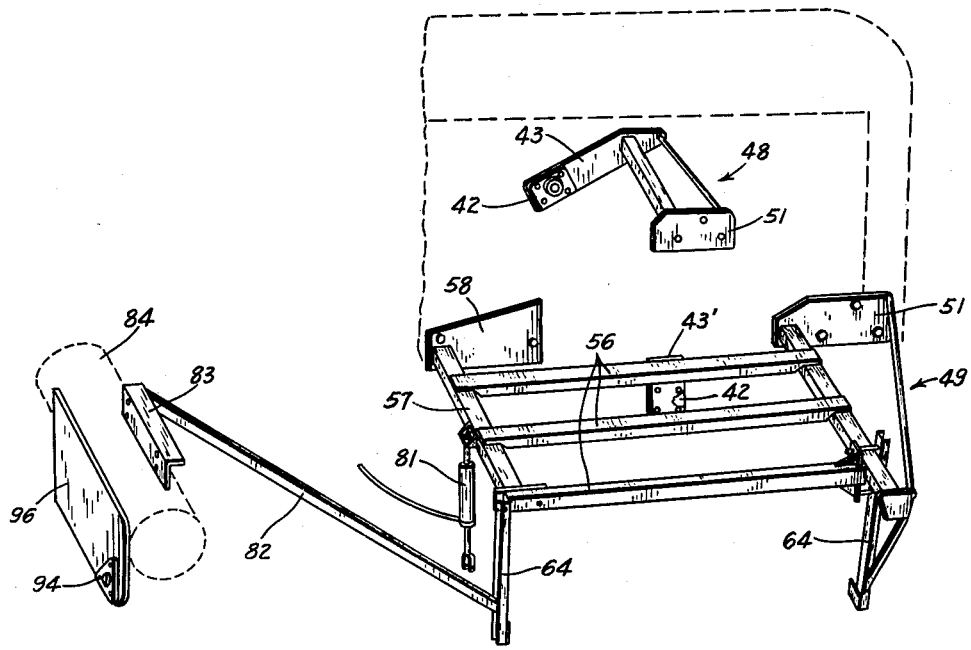
FIG. 4 is a schematic perspective view of the frame structure for attaching the harvester operating units to the tractor.

Referring to the drawings, the mechanical cucumber harvester of this invention is indicated generally at 10 in FIG. 1 and is adapted for connection to a conventional farm tractor 11 having widespread front wheels 12 interconnected by an upwardly offset axle 13.

Figure 5:
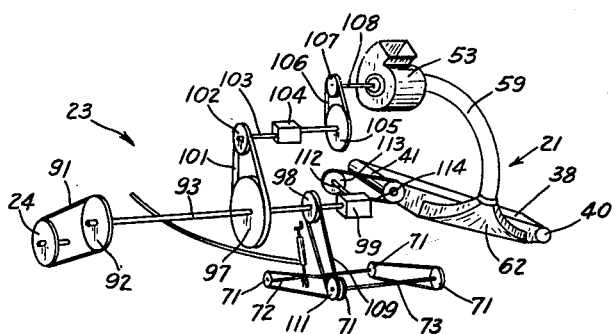
FIG. 5 is a reduced schematic perspective view of the driving mechanism and associated parts for the harvester.

The harvest 10 comprises a cucumber vine pickup unit 14 mounted below the front of the tractor engine housing 16 and between the front wheels 12, and which is disposed in a longitudinally extended, upwardly and rearwardly inclined position whereby the front end 17 of the pickup unit is adjustably supported adjacent the ground surface by tie rods 18 and a cable and pulley arrangement 19 connected to the tractor. The harvester 10 includes further a suction device 21 for effecting a subatmospheric pressure within the pickup unit 14, and a transversely disposed cucumber picking unit 22 mounted below the engine housing 16 with a forward portion thereof located below the rear portion of the pickup unit 14. A driving mechanism indicated generally at 23 in FIG. 5 and described in detail hereinafter is provided for obtaining power from the rear power takeoff 24 of the tractor 11 for operating the components of the harvester 10.

The pickup unit 14 includes a vacuum chamber 26 (FIGS. 1 and 2) formed by an inverted four sided pan 27 having an open bottom and the top 28 of which is secured to an X-formation of angle irons 29. At their outer ends the angle irons 29 are connected to a pair of parallel angle irons 31 extended longitudinally of the tractor and secured to the upper side edges of the pan 27. An additional pair of angle irons 32, only one of which is shown in FIG. 2, are secured between the ends and along the lower side edges of the pan 27, whereby the inwardly extended legs 33 of the angle irons 32 extend toward each other for a purpose hereinafter described. The front lower end 34 of the pan is formed in a diagonal manner by a pair of short angle irons 36, only one of which is shown in FIG. 2, also having their lower legs 37 extended inwardly toward each other.

A continuous rubberized fabric, perforated belt 38 having a width equal at least to that between the sides 39 of the pan 27 is trained over a front roller 40 rotatably connected at its ends to the angle irons 31 and extended transversely in front of the pan, and over a rear roller 41 rotatably mounted in bearing units 42 secured to the free ends of a pair of bracket arms 43 and 43' (FIGS. 1 and 4) on each side of the tractor 11. The left arm 43, as viewed from the rear of the tractor, is extended rearwardly from a lateral mount 48 secured by a plate 51 to the tractor. The right arm 43' depends from the inner support of a trio of laterally spaced, parallel braces 56 (FIG. 4) extended rearwardly from another lateral mount 49. The braces are connected at their rear ends to a support 57 extended laterally from a plate 58 secured to the tractor 11.

Guide roller rods 44 and 46 (FIG. 2) are rotatably mounted at each lower end of the pan 27, for guiding the belt 38 over the inwardly extended angle iron legs 33 and 37 defining the open bottom of the pan 27. The rear roller 41 is adjustably mounted for aligning and tightening the belt. Thus, upon rotation of the rear roller 41, the belt 38 is caused to move downwardly and forwardly over the upper inwardly extended legs 47 (FIG. 2) of the upper angle irons 31, rearwardly over the short legs 37, and then upwardly at an inclined angle over the legs 33, whereby to provide a movable closure member for the open bottom of the pan 27.

The inclination of the pickup unit 14 is provided by the rear roller bearing units 42 being mounted just below the bottom of the tractor engine housing 16 whereas, by virtue of the adjustable cable arrangement 19, the front roller 40 is adjustably positioned relative to the ground surface. By this arrangement, the front lower end 34 (FIG. 2) of the pickup unit may be maintained substantially horizontal to the ground surface.

Figure 6:
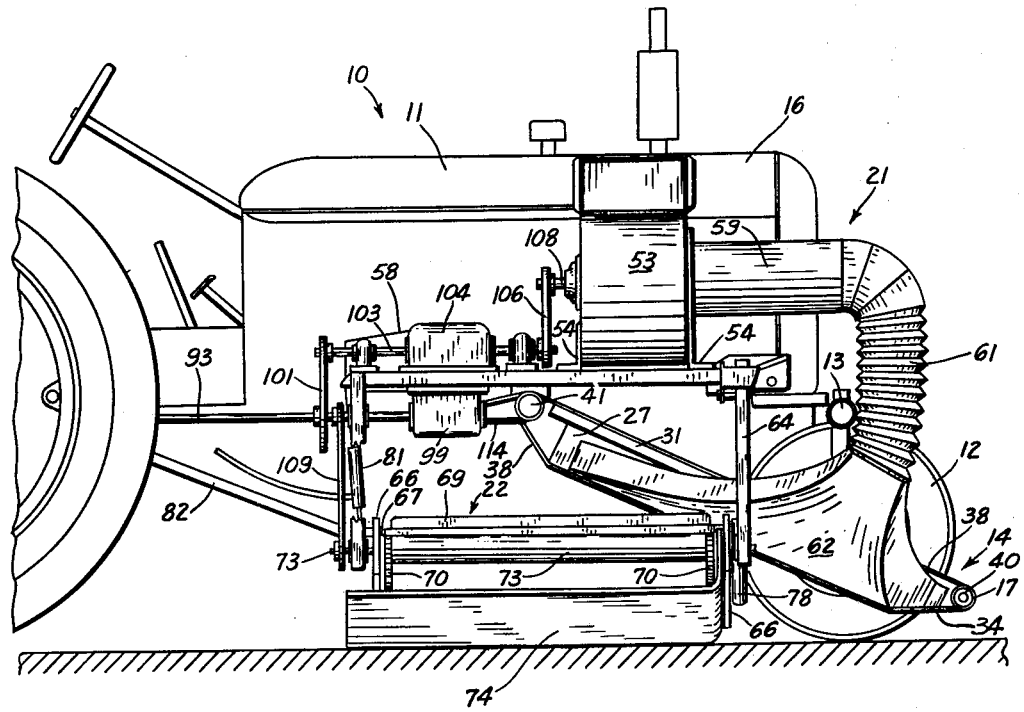
FIG. 6 is a side elevational view of the tractor in assembly relation with the harvester, some parts removed and others broken away for the purpose of clarity.

To apply suction to the chamber area 26, whereby to create a vacuum at the perforations or holes 52 in the belt 38, the suction device 21 includes a fan assembly 53 (FIGS. 5 and 6) of commercial manufacture mounted by means of brackets 54 on top of the supports 56 (FIG. 1). A duct 59 (FIG. 6) extends forwardly of the fan 53 and is joined to a flexible duct 61 which in turn is connected to a vacuum head 62 secured and open to the right side of the vacuum chamber 26. Assuming each of the holes 52 to be one-half of an inch in diameter, the vacuum available at the holes should be at least five inches of water.

Upon operation of the fan 53, a vacuum is created within the chamber 26, and as the bottom of the chamber 26 is open, air can flow only upwardly through the holes 52 in the underside of the belt 38 as it moves upwardly and rearwardly relative to the front roller 40. Of note, the force created by the vacuum on the inside surface of the belt 38 causes it to pull against the bottom sides of the inwardly extended legs 33 and 37 of the lower angle irons 32 and 36, thus sealing itself against possible leaks.

Figure 7:
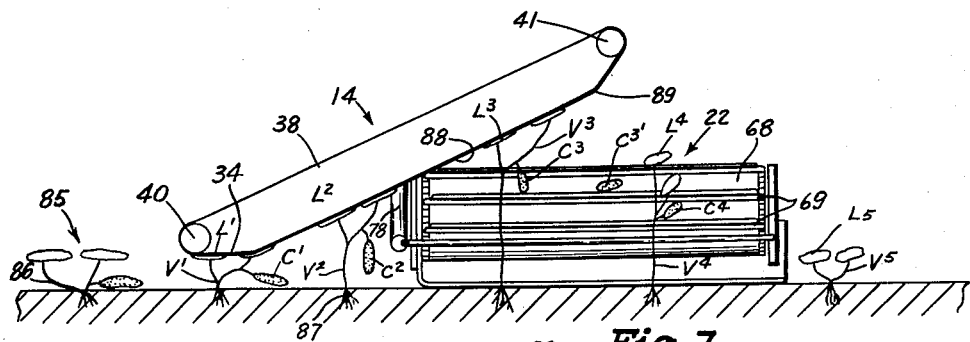
FIGS. 7 and 8 are side and rear diagrammatic views, respectively, of the pickup and picking units and showing their action with respect to a cucumber vine.
Figure 8:
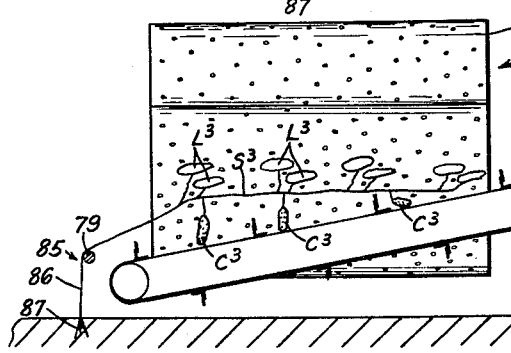

The picking unit 22 is supported at its upper end beneath the tractor 11 by a pair of longitudinally spaced channel irons 64 (FIG. 4) which depend from the right mount 49 and the rear support 57, and extends downwardly and outwardly from the left of the tractor with its front end engaging the ground surface. Referring particularly to FIGS. 7 and 8, it is seen that the inclination of the unit 22 is slight, that its length transversely of the tractor is of a greater extent than the width of the pickup unit belt 38, and that it extends beneath the pickup unit 14 substantially half its width longitudinally of the tractor.

Structurally, the picking unit 22 comprises a pair of longitudinally spaced elongated side plates 66 (FIGS. 1 and 3) pivotally secured at their upper ends to the bottom of the channel irons 64, a pair of angle irons 67 each secured to a side plate, and a stationary apron 68 extended between and connected to the angle irons 67. A plurality of right angle, resilient contact members or cleats 69 (FIG. 1) are extended longitudinally across the apron 68 and are connected at their ends to a pair of endless sprocket chains 70 carried on sprockets 71 (FIG. 5) mounted on each end of lower and upper shafts 72 and 73. By this arrangement, upon rotation of the upper shaft 73 the cleats 69 are adapted to be moved upwardly over the upper surface of the apron 68.

To protect the underside of the picking unit 22, an L-shaped member 74 has an upstanding leg 76 (FIG. 1) secured to the front side plate 66 and a horizontally disposed leg 77 extended rearwardly of the tractor beneath the entire unit 22. A soft rubber roller 78 (FIGS. 1 and 3) is rotatably mounted to the forward plate 66 so as to extend along the leading edge or front side of the picking unit 22. Additionally, a vine support rod 79 (FIG. 1) is supported across the lower end of the unit 22 so as to be parallel and in substantial alignment with the top or outer edges of the cleats 68. For adjusting the height of the lower end of the picking unit 22 relative to the ground surface, a hydraulic cylinder 81 (FIGS. 4 and 6) is connected between the rear support 57 and the rear side plate 66. The cylinder 81 is suspended adjacent a stabilizing member 82 connected between the support 57 and a bracket 83 mounted on the front side of the tractor rear axle 84.

In the use and operation of the mechanical cucumber harvester 10, the tractor 11 is guided over a row of cucumber vines 85 (FIGS. 7 and 8) which have been trained to lie with their main stems 86 perpendicular to the row center. The tractor then moves in a direction parallel to the row center and is driven so that the vine support rod 79 is guided adjacent the roots 87 (FIG. 8) of the vines. By driving the tractor 11 in this manner, the majority of the vines and their leaves will pass beneath the pickup belt 38.

The pickup unit 14, the suction device 21, and the picking unit 22 are operable, by means hereinafter described, such that as the substantially horizontally disposed lower end 34 (FIGS. 6 and 7) of the perforated belt 38 passes over a vine V', the vacuum at the holes in the belt 38 causes the leaves L' to be drawn and held against the belt 38.

The vine V' is depicted herein as having a pair of leaves L' and a cucumber C'. In actuality, the vine stem grows approximately eight to ten inches high, then runs along the ground. Before a first picking, the vines may average about twenty-four inches long while at the time of the fifth picking the length of the main stem may be from sixty to seventy-two inches. Laterals or branches which start to grow perpendicular to the main stem begin forming soon after the vine starts to run. These laterals are spaced from one to two inches apart and at the time of a second picking may be twelve inches from the vine root. The leaves of the vine grow at each node where a lateral eventually emerges, have an average height of seven inches above the main stem for half its length from the root, and are numbered approximately fifty per average vine at the second picking. The average area of the leaves per vine is approximately twenty-five square inches. It should be noted that this data is subject to some variation, dependent upon the kind of cucumbers and the part of the country where they are grown.

By gearing the speed of the belt 38 to the speed of forward movement of the tractor 11, the relative movement between the underside 88 (FIG. 7) of the belt and the ground is substantially zero. FIG. 7 thus depicts the action of the harvester 10 as it moves with respect to a single stationary vine V', showing the progressive stages of the cucumber harvesting operation. After the leaves L' have been drawn against the belt 38 in the first stage, the second stage shows the leaves L2 being retained against the belt and with the vine V2 and the cucumber C2 being elevated and suspended in the air, the roots 87 remaining in the ground. As the continually elevated vine V2 approaches the picking unit 22, the roller 78 facilitates lifting the vine onto the unit 22 and prevents its being caught on the front edge thereof, while guiding the stem of the vine onto the guard 79.

At the third stage, with the leaves L3 still being vacuum-retained against the belt 38, the suspended cucumber C3 is in a position where it is engageable by the cleats 69, such that upon being contacted thereby the cucumber C3' is separated, or picked, from the vine V3 and falls onto the apron 68 for movement by the cleats upwardly on the unit 22 for discharge either to the ground or to a receptacle (not shown) for collection. When the belt 38 reaches the corner 89 (FIG. 7) defining the rear end of the pan 27 and the vacuum chamber 26, the release or lack of vacuum permits the vine V4 to drop in a fourth stage position onto the picking unit 22 where the cleats 69 act to support the vine V4 by their top edges while separating the remaining cucumbers, such as C4, left on the vine. In the fifth and last stage, the mechanically picked vine V5 is dropped to the ground in its original position extended vertical to the row center.

Referring now to FIG. 8, the inclination of the picking unit 22 relative to the pickup unit belt 38 is noted, the latter maintaining the leaves L3 substantially horizontally aligned and whereby the main stem S3 is maintained substantially straight. FIG. 8 best illustrates how advantage is taken of nature wherein the cucumbers C3 closest the roots 87 are the largest and longest relative to those further out on the vine. Thus, as the belt 38 moves the vine V3 over the picking unit cleats 69, all the cucumbers whether large or small, are contacted by the cleats for removal from the vine. It is also noted in FIG. 8 that the function of the vine support rod 79, located substantially directly above the root 87, is to maintain the stem portion of the vine near the root 87 spaced away from the cleats 69 so as to prevent the vine from being uprooted.

To provide power for the harvester 10, a belt 91 (FIG. 5) is trained from the rear power takeoff 24 of the tractor to a pulley 92 secured to the rear end of a drive shaft 93. The shaft 93 extends through a bearing unit 94 (FIG. 4) secured to a bracket 96 supported on the rear axle 84, and has a large pulley 97 and a small pulley 98 secured thereto rearwardly of a gear reduction unit 99 at the front of the shaft 93.

A belt 101 and a pulley 102 transmit drive from the large pulley 97 through a shaft 103 to a gear box 104 for increasing the drive r.p.m., and through another pulley 105, belt 106 and pulley 107 for the fan drive shaft 108. Power is taken off the small pulley 98 by a belt 109 trained about a pulley 111 for rotating the rear shaft 73 on the picking unit 22. The gear reduction unit 99 transmits power through a shaft 112, a pulley 113 and a belt 114 for the upper rear roller 41 of the pickup unit.

Although a preferred embodiment of the invention has been described herein, it is to be noted that modifications may be made thereto within the full scope of the invention as defined in the appended claims.

We claim:

1. A cucumber harvesting machine including a self-propelled portable frame having a power unit, a cucumber vine pickup unit mounted on and located below said frame adjacent the front end thereof and including a chamber means having an open bottom and a perforated belt member movably supported about said chamber means so as to move rearwardly across said bottom, with said bottom being inclined upwardly and rearwardly, a picking unit mounted on and located below said frame including a conveyor means extended transversely of said frame with a portion thereof positioned below said pickup unit, upright contact members on said conveyor, means for effecting a subatmospheric pressure in said chamber means, and means for driving said latter means and said pickup and picking units from said power unit, with said pickup unit, on traverse of said frame over cucumber vines, acting to pick up and move said vines rearwardly so that the cucumbers suspended therefrom are acted upon and removed from said vines by said contact members for removal by said conveyor means.

2. A cucumber harvesting machine including a self-propelled portable frame, a cucumber vine pickup unit located below the front end of said frame, means adjustably supporting said pickup unit on said frame, an chamber means in said pickup unit having an open bottom portion, a perforated belt member movably supported above said chamber means and extended across the bottom portion thereof for movement in a direction longitudinally of said frame, with said bottom portion having a substantially horizontal front section and an upwardly and rearwardly inclined rear section, means for effecting a subatmospheric air pressure in said chamber means, an elongated picking unit supported from and extended transversely of said frame with a portion thereof positioned below said inclined rear section, a conveyor means movably supported on said picking unit for travel transversely of said frame, and resilient upright contact members secured to and extended transversely of said conveyor means, with said pickup unit on forward movement of said frame over cucumber vines acting to pick up and move said vines rearwardly over said picking unit whereby cucumbers suspended from said vines are engaged and removed from said vines by said contact members for dropping onto said conveyor means.

3. A machine for harvesting cucumbers from vines having their root ends in a row and the vines extended substantially normal to the row, said machine including a self-propelled portable frame, a vine pickup unit supported from said frame at a position adjacent the front end thereof and having an upwardly and rearwardly inclined lower portion, means at said lower portion for picking up and moving vines along said lower portion as said frame is forwardly advanced, a cucumber picking unit extended transversely of and supoprted from said frame, so that a portion thereof underlies the inclined lower portion of said pickup unit, said picking unit including a conveyor means movable transversely of said frame with the upper flight thereof movable away from the root ends of the vines, upright resilient contact members on said conveyor means extended longitudinally of said frame for engaging and removing cucumbers suspended from the inclined lower portion of said pickup unit, and means on said picking unit for lifting the vine portions adjacent the root ends thereof to an elevated position out of engagement with said contact members.

4. A cucumber harvesting machine including a self-propelled portable frame, a pickup unit supported from said frame and having an upwardly and rearwardly inclined bottom portion, and including means for picking up and moving cucumber vines along said bottom portion, and a picking unit supported from said frame at a position below said bottom portion, said picking unit including contact members movable into engagement with cucumbers suspended from the vines on said pickup unit to remove the cucumbers from the vines.

5. A cucumber harvesting machine including a self-propelled portable frame, a pickup unit supported from said frame including an air chamber means having a lower side formed with an upwardly and rearwardly inclined portion and a forwardly extended front portion said lower side being open to the atmosphere, a perforated flat belt member movably supported on said pickup unit for movement about said chamber means in a direction longitudinally of said frame, with the lower length of said belt member acting as a movable closure for said lower side and being movable in a rearward direction means on said frame for effecting a subatmospheric pressure in said chamber means, whereby as said frame is forwardly advanced cucumber vines are picked up at said front portion and held against said belt member for movement along said upwardly and rearwardly inclined portion, and a picking unit supported from said frame at a position below said upwardly and rearwardly inclined portion, said picking unit including contact members movable into engagement with cucumbers suspended from the vines on said pickup unit to remove the cucumbers from the vines.

6. A cucumber harvesting machine including a self-propelled portable frame, a pickup unit supported below said frame and having a bottom portion extended transversely of said frame and inclined upwardly and rearwardly from the front thereof, means movable longitudinally of said bottom portion in a direction rearwardly of the front thereof, and means for applying a vacuum to said longitudinally movable means, whereby upon forward movement of said portable frame over cucumber vines, the leaves of said vines are sucked against said longitudinally movable means whereby to elevate said cucumber vines above the ground surface, and a picking unit supported from said frame at a position below said bottom portion, said picking unit including contact members movable into engagement with cucumbers suspended from the elevated vines to remove the cucumbers therefrom.

References Cited in the file of this patent

UNITED STATES PATENTS

| | | |
|---|---|---|
| 2,670,584 | Rood et al. | Mar. 2, 1954 |
| 2,817,939 | Graham et al. | Dec. 31, 1957 |
| 2,829,484 | Gilbert | Apr. 8, 1958 |
| 2,841,947 | Grew | July 8, 1958 |
| 2,893,193 | Gilbert | July 7, 1959 |
| 2,903,839 | Grew | Sept. 15, 1959 |